United States Patent
Xu et al.

(10) Patent No.: US 9,934,578 B2
(45) Date of Patent: Apr. 3, 2018

(54) METHOD FOR EDGE DETECTION

(71) Applicant: Macau University of Science and Technology, Macau (CN)

(72) Inventors: Yi Xu, Macau (CN); Jiaxiang Chen, Macau (CN)

(73) Assignee: Macau University of Science and Technology, Macau (CN)

( * ) Notice: Subject to any disclaimer, the term of this patent is extended or adjusted under 35 U.S.C. 154(b) by 87 days.

(21) Appl. No.: 15/236,488

(22) Filed: Aug. 15, 2016

(65) Prior Publication Data

US 2018/0047167 A1 Feb. 15, 2018

(51) Int. Cl.
*G06T 5/00* (2006.01)
*G06T 7/00* (2017.01)
*G06T 7/13* (2017.01)

(52) U.S. Cl.
CPC .......... *G06T 7/0085* (2013.01); *G06T 7/0097* (2013.01); *G06T 7/13* (2017.01); *G06T 2207/20012* (2013.01); *G06T 2207/20044* (2013.01); *G06T 2207/30181* (2013.01)

(58) Field of Classification Search
CPC ........................................... G06T 7/10–7/136
See application file for complete search history.

(56) References Cited

U.S. PATENT DOCUMENTS

| | | | | |
|---|---|---|---|---|
| 2003/0007186 A1* | 1/2003 | Suino | ...... | G06K 15/02 358/3.15 |
| 2012/0051650 A1* | 3/2012 | Aisaka | ...... | G06K 9/00234 382/195 |
| 2015/0351682 A1* | 12/2015 | Yamanashi | ...... | A61B 5/442 600/476 |
| 2016/0189005 A1* | 6/2016 | Yin | ...... | G06K 9/342 382/197 |
| 2017/0098310 A1* | 4/2017 | Chefd'hotel | ...... | G06T 7/12 |
| 2017/0160869 A1* | 6/2017 | Tang | ...... | G06F 3/0418 |
| 2017/0236258 A1* | 8/2017 | Hsu | ...... | G06T 5/20 382/260 |
| 2017/0301078 A1* | 10/2017 | Forutanpour | ...... | G06T 7/0004 |

OTHER PUBLICATIONS

Canny, J. (1986). A computational approach to edge detection. IEEE Transactions on pattern analysis and machine intelligence, (6), 679-698.
Ehsani, A.H. (2008). Morphometric and Landscape Feature Analysis with Artificial Neural Networks and SRTM data: Applications in Humid and Arid Environments. Royal Institute of Technology, Sweden.

(Continued)

*Primary Examiner* — Sean Motsinger
(74) *Attorney, Agent, or Firm* — Eagle IP Limited; Jacqueline C. Lui

(57) ABSTRACT

A computer system executes a method that detects an edge of an object with a Canny operator. The method calculates a gradient strength of pixels of the image and applies non-maximum suppression to the image to avoid spurious responses to edge detection. The image is divided into multiple partitions based on a brightness distribution of the pixels in the image and a set of dynamic threshold values. Multiple images for the partitions are superimposed to detect an edge of the object.

20 Claims, 11 Drawing Sheets

(56) References Cited

OTHER PUBLICATIONS

Gonzalez, R. C., & Woods, R. E. (2008). Digital image processing. Prentice Hall.

Jiang, H., Tian, X., & Xu, A. (2013). An automatic algorithm for detecting lunar impact craters in a defined feature space. Scientia Sinica Physica, Mechanica & Astronomica, 43, 1430.

Li, H. Q., Yu, Q. C., & Fang, M. (2008). Application of Otsu thresholding method on Canny operator [J]. Computer Engineering and Design, 9, 046.

Yuan, Y., Zhu, P., Zhao, N., Jin, D., Zhang, J., & Zhou, Q. (2013). Automatic identification of circular mare craters based on mathematical morphology. Scientia Sinica Physica, Mechanica & Astronomica, 43, 324.

\* cited by examiner

METHOD FOR EDGE DETECTION

FIELD OF THE INVENTION

The present invention relates to a method of detecting an edge of an object with a Canny operator.

BACKGROUND

Remote sensing technology has been widely used in variety of areas such as geology, climate, economy, environmental protection, etc. Analysis of remote images usually requires edge detection of objects of interest for the purposes of categorization and statistics. However, extracting the characteristics of objects manually is time consuming and error prone due to the large amount of remote sensing images and the irregular shape of the objects.

In view of the demand for analysis of images such as remote images, a method of detecting the edge of objects is desired.

SUMMARY OF THE INVENTION

Figure 1:
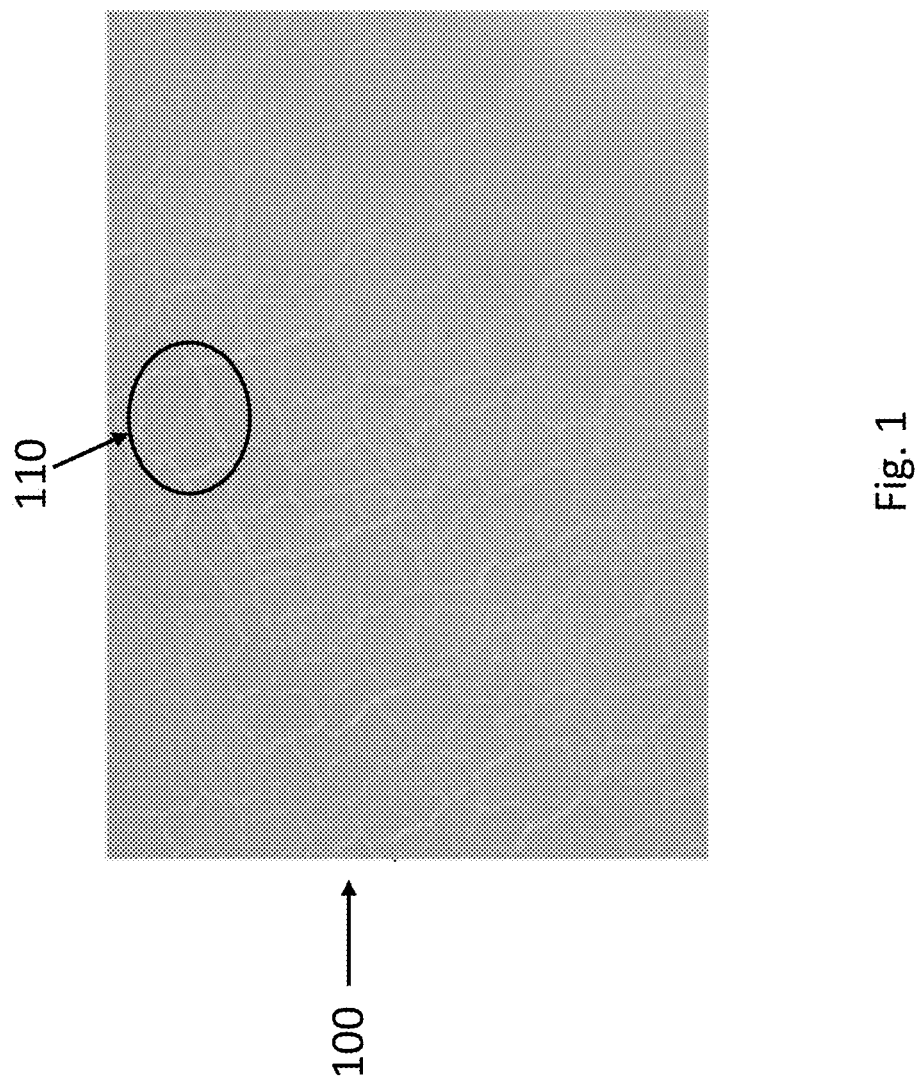
FIG. 1 shows a remote sensing image of Polygonal Patterned Ground (PPG) in accordance with an example embodiment.

One example embodiment is a method executed by a computer system to detect an edge of an object with a Canny operator. The method includes executing a Gaussian filter to smooth an image of the object so that noise of the image is removed; calculating a gradient strength of pixels of the image; applying non-maximum suppression to the image to avoid spurious responses to edge detection; dividing the image into multiple partitions based on a brightness distribution of the pixels in the image; calculating a set of dynamic threshold values of T_high and T_low based on the brightness distribution of the pixels within each of the multiple partitions; obtaining a first image for each of the multiple partitions by setting to 0 the gradient strength of each pixel that is less than the T_high; obtaining a second image for each of the multiple partitions by setting to 0 the gradient strength of each pixel that is less than T-low; and detecting the edge of the object by superimposing the first image and the second image.

Other example embodiments are discussed herein.

DETAILED DESCRIPTION

Example embodiments relate to methods to detect an edge of an object with a Canny operator by a computer system. In an example embodiment, the methods can be used to detect the edge of the object that has regular or irregular shape.

Edge extraction technology has been applied in face recognition, license plate recognition, crater recognition and many other fields. For example, crater is a factor in determining the age of lunar geology. There is an algorithm based on the feature space of craters for automatic recognition. The charge-coupled device (CCD) image is converted into a feature space image, and then adaptive canny algorithm is used to detect candidate area for crater. Ellipse fitting is applied to the candidate area. The craters are recognized and extracted automatically based on mathematical morphology. First, the gray gradient of the CCD image is calculated and binary gradient image is analyzed, followed by mathematical morphology operations to detect the edges. Ellipse fitting is used to locate the craters. The shape of craters is similar to circular or elliptical, thus ellipse fitting can be directly applied in crater recognition. However, this method is not applicable to edge detection for objects that have irregular shapes. Edge detection of irregular shaped objects is more complicated than craters. Irregular shaped objects have many varieties of structures, including triangle, quadrilateral, pentagon and many other graphics. The edges of irregular shaped objects could be broken and discontinuous. Directly applying existing techniques cannot detect the edge of objects with irregular shapes. Example embodiments provides a method to detect edge of objects with irregular shapes.

An example embodiment includes a method of detecting an edge of an object with a Canny operator by a computer system. A Gaussian filter is applied to smooth an image of the object so that noise of the image is removed. A gradient strength of pixels of the image is calculated by the computer system. Non-maximum suppression is applied to the image so that spurious responses to edge detection is avoided. The image is divided into multiple partitions based on a brightness distribution of the pixels in the image. A set of dynamic threshold values of T_high and T_low is set for each of the multiple partitions and the set of threshold values is calculated based on the brightness distribution of the pixels in the partition. A first image for each of the multiple partitions is obtained by setting to 0 the gradient strength of each pixel that is less than the T_high. A second image for the partition is obtained by setting to 0 the gradient strength of each pixel that is less than T-low. The edge of the object is detected by superimposing the first image and the second image. The detected edge of the object is displayed on the computer system for further analysis.

In one embodiment for example, the method includes a pre-processing procedure, canny operation with dynamically tuned threshold values, noise removal and morphological operations. The pre-processing procedure includes conversion of a color image into a grayscale image, application of histogram equalization to the grayscale image, application of median filtering to the grayscale image and followed by homomorphic filtering for further improvement of the grayscale image. The canny operation procedure includes application of Gaussian filtering to the pre-processed image so that the noise is further removed, calculation of a gradient strength of pixels of the image, application of non-maximum suppression to the image so that spurious responses to edge extraction is avoided, division of the image into multiple partitions based on a brightness distribution of the pixels in the image, calculation of a set of dynamic threshold values of T_high and T_low for each of the multiple partitions based on the brightness distribution of the pixels within the partition, generation of a first image for each of the multiple partitions by setting to 0 the gradient strength of each pixel that is less than the T_high, generation of a second image for the partition by setting to 0 the gradient strength of each pixel that is less than the T_low, detection of edge points of the object by superimposing the first image and the second image, removal of short or curly lines from the edge points, extraction of the object edge by connecting the adjacent edge points.

In an example embodiment, morphological operations are applied to connect the adjacent edge points. Morphological operations include erosion operation, dilation operation and skeletonized operation.

FIG. 1 shows a remote sensing image 100 of Polygonal Patterned Ground (PPG). The edge 110 of PPG has irregular shapes. A pre-processing procedure is applied onto the remote sensing image so that the effect of edge detection for the PPG can be improved. In one example, if the image of PPG is a color image, the color image will be converted into a grayscale as the final output will be an outline of the PPG. Next, histogram equalization is used to improve contrast of the image. Subsequently, median filtering is applied onto the image to reduce noise of the image, followed by homomorphic filtering for image enhancement.

Figure 2:
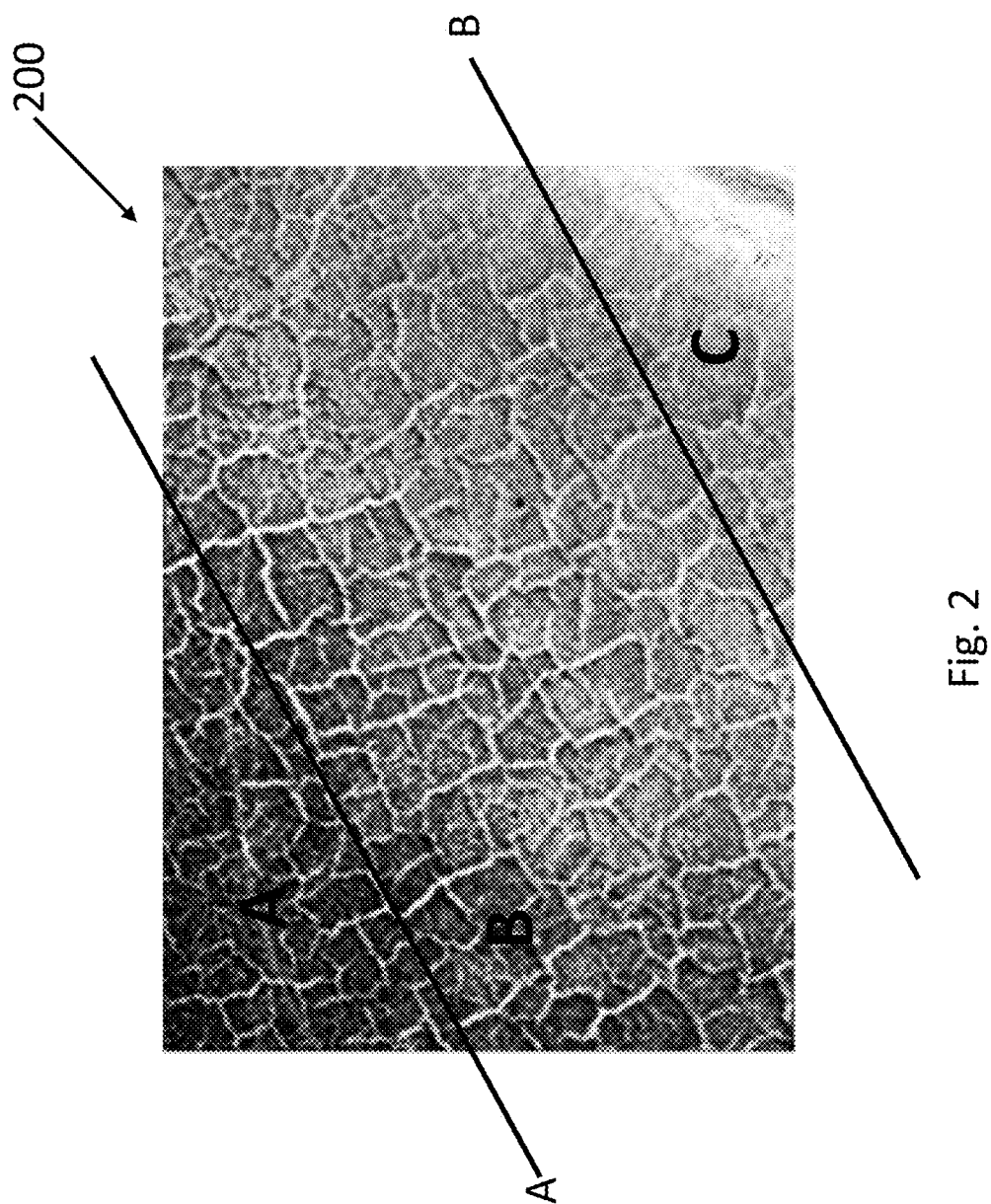
FIG. 2 shows an image after pre-processing treatment in accordance with an example embodiment.

FIG. 2 shows an image 200 that undergoes a pre-processing procedure and is divided into three partitions by lines A and B. In one example embodiment, a canny operator is applied to further analyze the image 200.

A Gaussian filter is applied to smooth the image 200 so that the noise of the image is removed. Gradient strength and direction of the image are calculated. Subsequently, non-maximum suppression is applied to get rid of spurious response to edge detection. A local maximum pixel is located and the non-maximum corresponding gray value will be set to 0. Thus a large part of the non-edge points is removed.

Non-maximum suppression is applied to "thin" the edge. After applying gradient calculation, the edge extracted from the gradient value is still quite blurred. There should only be one accurate response to the edge. Thus non-maximum suppression can help to suppress all the gradient values to 0 except the local maximal, which indicates location with the sharpest change of intensity value. The algorithm for each pixel in the gradient image is as follows:

1. Compare the edge strength of the current pixel with the edge strength of the pixel in the positive and negative gradient directions.
2. If the edge strength of the current pixel is the largest compared to the other pixels in the mask with the same direction (i.e., the pixel that is pointing in the y direction, it will be compared to the pixel above and below it in the vertical axis), the value will be preserved. Otherwise, the value will be suppressed.

In an example embodiment, the algorithm categorizes the continuous gradient directions into a small set of discrete directions, and then moves a 3×3 filter over the output of the previous step (that is, the edge strength and gradient directions). At every pixel, it suppresses the edge strength of the center pixel (by setting its value to 0) if its magnitude is not greater than the magnitude of the two neighbors in the gradient direction.

The brightness of remote sensing image usually varies in different locations due to the illumination angle. As illustrated in FIG. 2, regions A, B and C divided by the lines A and B have different brightness. Therefore, it is not accurate if fixed threshold values are used to determine whether the pixel is an edge point or not, especially when the brightness of the region is too strong or too weak, e.g. regions A and C. In one example embodiment, the threshold value is changed based on the local contrast. The definition of "local" here means the small partition of the image where the pixel is located.

There are multiple ways to do image partition. The image can be divided into two parts, four parts, or eight parts, etc. The image can be divided equally or unevenly. The shape of each partition can be triangle, diamond, rectangle, cross, or irregular forms. The way of image partition depends on the change of image brightness. For example, FIG. 2 is divided into three parts with different brightness.

For each partition of the remote sensing image, a set of threshold values (T_high & T_low) are set based on the brightness distribution of all the pixels within the partition. The threshold value is determined dynamically. It is based on the gradation characteristics of the image to separate the background and objectives.

In one example embodiment, the ratio of T_high and T_low is 2.5-2. In another example embodiment, the ratio of T_low and T_high is 0.4.

For each of the partitions, a first image is obtained by setting the gradient value of the pixel that is less than the threshold T_high to 0. A second image for the same partition is obtained by setting the gradient value of the pixel that is less than the threshold T_low to 0. Then, the first image and the second image are superimposed to generate an output image as shown in FIG. 3

Figure 3:
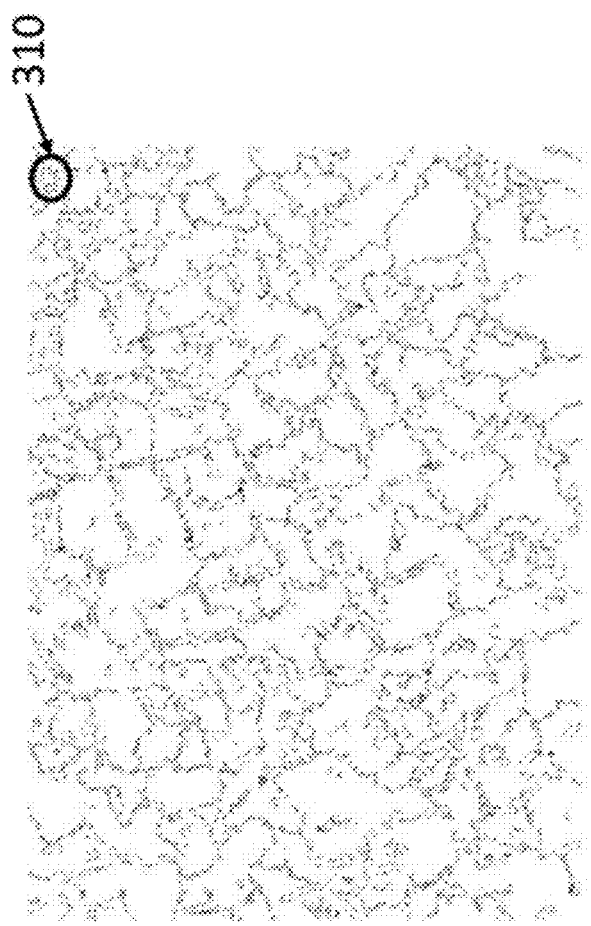
FIG. 3 shows an output image of edge points by canny operations with dynamically tuned threshold values in accordance with an example embodiment.

As shown in FIG. 3, the detected edge points have short and curly lines which are considered as noise, such as those in the circle 310. Two rules are set to remove the noise: (1) the area of the domain surrounded by the detected edge points should be no less than a certain threshold value Ta; (2) the perimeter of the domain surrounded by the connected edge points should be no less than another threshold Tc. This procedure can also delete some redundant edges. In one example embodiment, Ta is set as 20 pixels, and Tc is set as 38 pixels.

In one example, the value of Ta and Tc is set as upper limit of the area/perimeter of most redundant edges in the image. These two values should be smaller than the minimum value of the area/perimeter of the target object.

The detected edge points as shown in FIG. 3 are discontinuous and broken. Morphological operations are further applied to fill small cavity to connect adjacent edge points and smooth the border.

Figure 4:
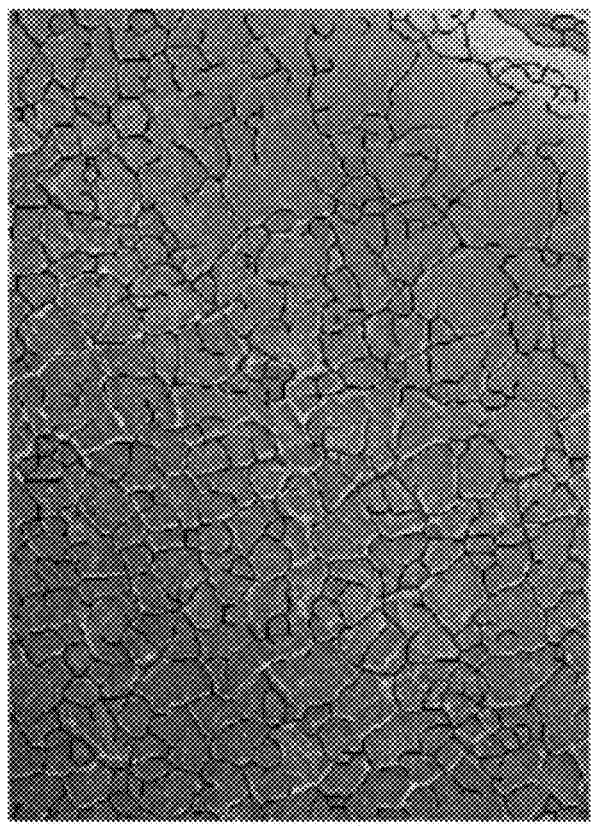
FIG. 4 shows an output image by superimposing detected edges on an original remote sensing image in accordance with an example embodiment.

Erosion operation is applied, followed by dilation operation and skeletonized operation. In erosion operation, do "and" operation with a structure element B and a binary image that is covered by the structure element B. The binary image is FIG. 3, which is obtained with canny operation. If all of bits are 1, the resulting image pixels are 1; otherwise, the resulting image pixels are 0. In dilation operation, do "and" operation with the structure element B and the binary image. If all of bits are 0, the resulting image pixels are 0; otherwise, the resulting image pixels are 1. After erosion and dilation operations, the adjacent edge points are connected and the marked edges are wider than the actual edge. A standard skeletonized operation is applied in order to obtain the sketch of the PPG. The edge image of the PPG after morphological operations is superimposed on the original remote sensing image 100 of the PPG to obtain the extracted edge of the PPG as shown in FIG. 4. The output is displayed by the computer system. The extracted edge can be further analyzed for various purposes, such as the age of the geology for the PPG.

In one example embodiment, the structural element B can be circle or triangle, etc.

Figure 5A:
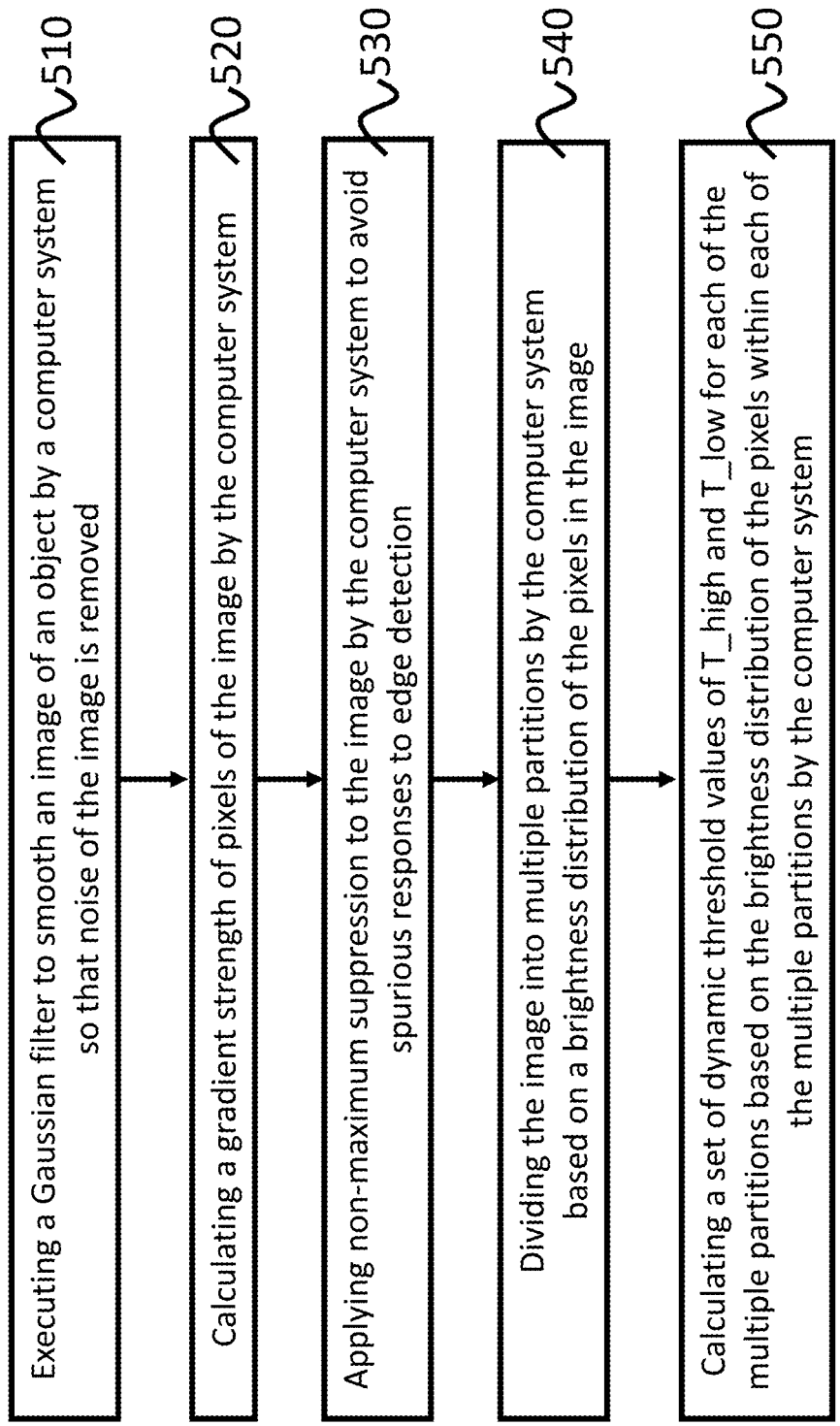
FIGS. 5A and 5B show a method to detect an edge of an object with a Canny operator in accordance with an example embodiment.
Figure 5B:
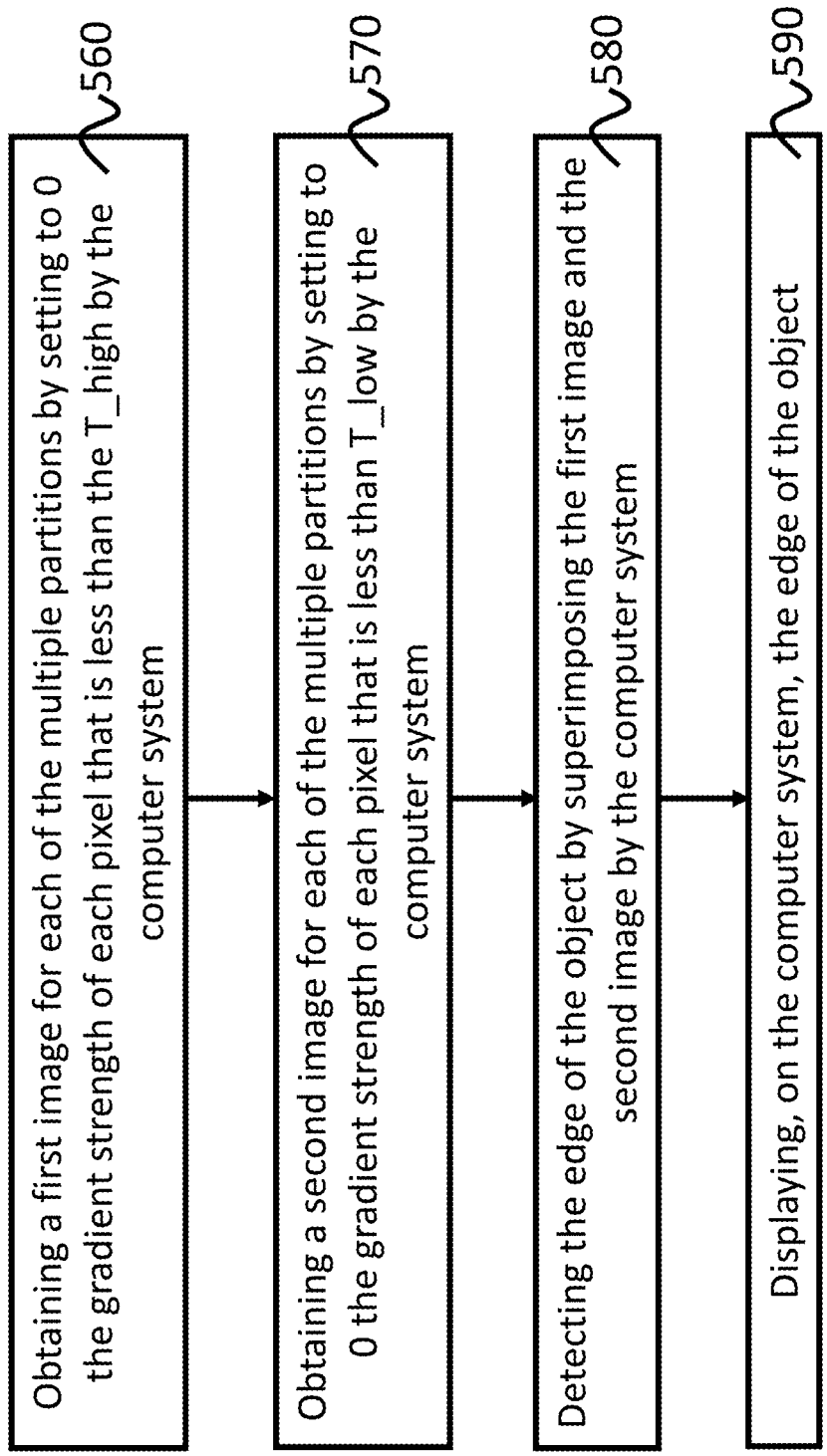

FIGS. 5A and 5B show a method executed by a computer system to detect an edge of an object with a Canny operator. According to block 510, a Gaussian filter is executed to smooth an image of the object by the computer system so that noise of the image is removed. According to block 520, a gradient strength of pixels of the image is calculated by the computer system. According to block 530, non-maximum suppression is applied by the computer system to avoid spurious responses to edge detection. According to block 540, the image is divided into multiple partitions by the computer system based on a brightness distribution of the pixels in the image. According to block 550, a set of dynamic threshold values of T_high and T_low for each of the multiple partitions are calculated by the computer system based on the brightness distribution of the pixels within each of the multiple partitions. According to block 560, a first image for each of the multiple partitions is obtained by setting to 0 the gradient strength of each pixel that is less than the T_high by the computer system. According to block 570, a second image for each of the multiple partitions is obtained by setting to 0 the gradient strength of each pixel that is less than the T_low by the computer system. According to block 580, the edge of the object is detected by superimposing the first image and the second image by the computer system. According to block 590, the edge of the object is displayed on the computer system.

Figure 6A:
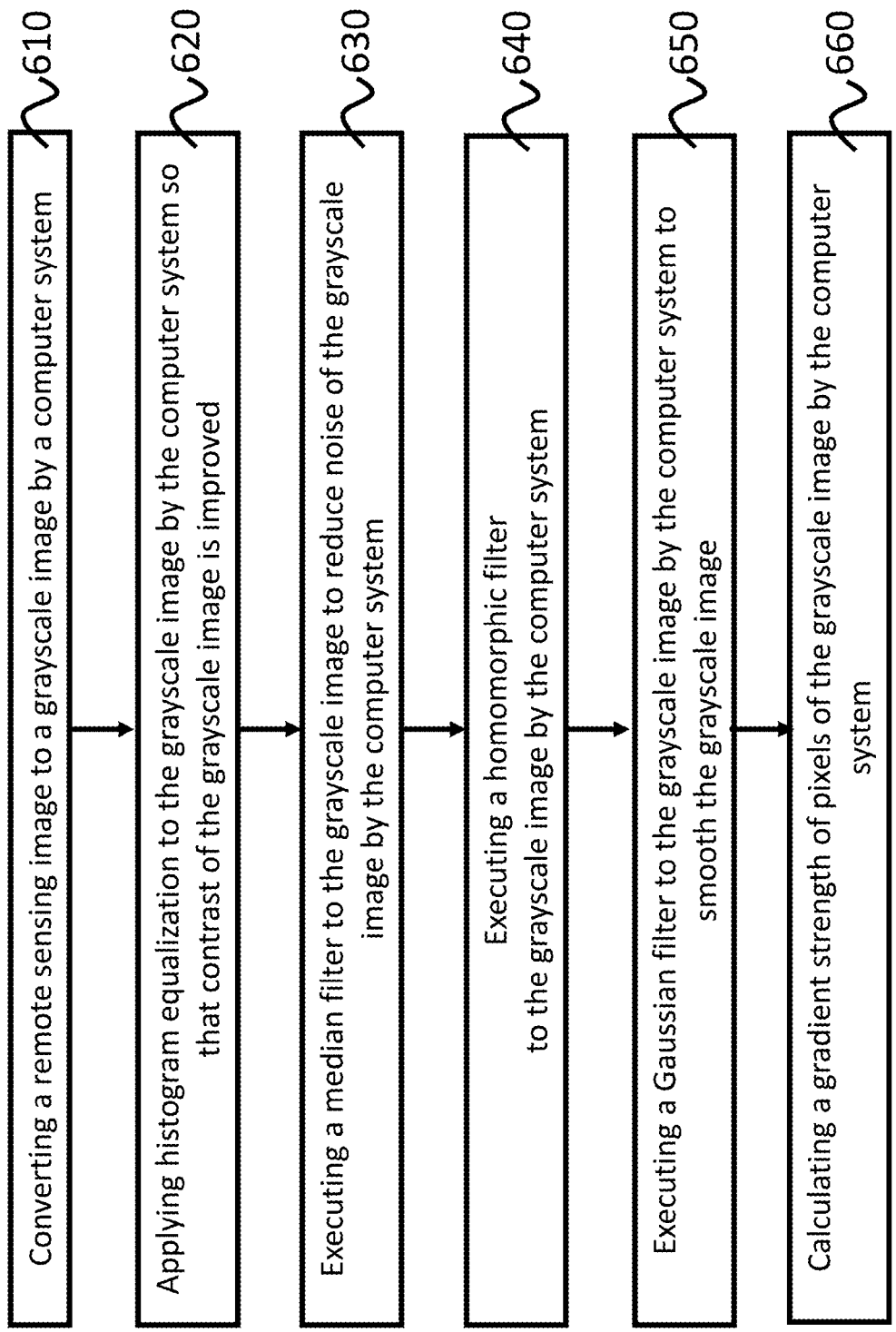
FIGS. 6A, 6B and 6C show a method to extract an edge of an object in a remote sensing image in accordance with an example embodiment.
Figure 6B:
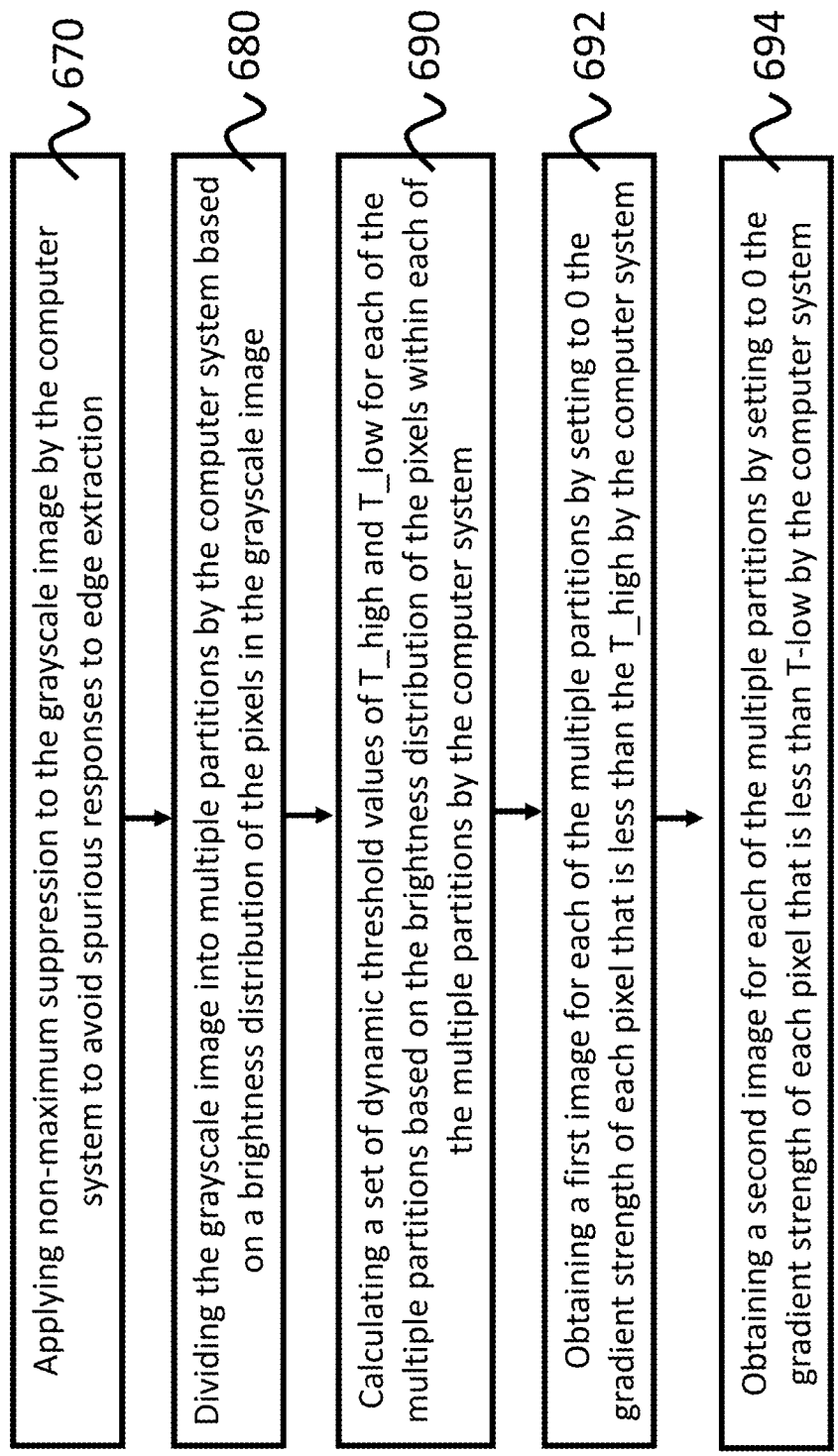
Figure 6C:
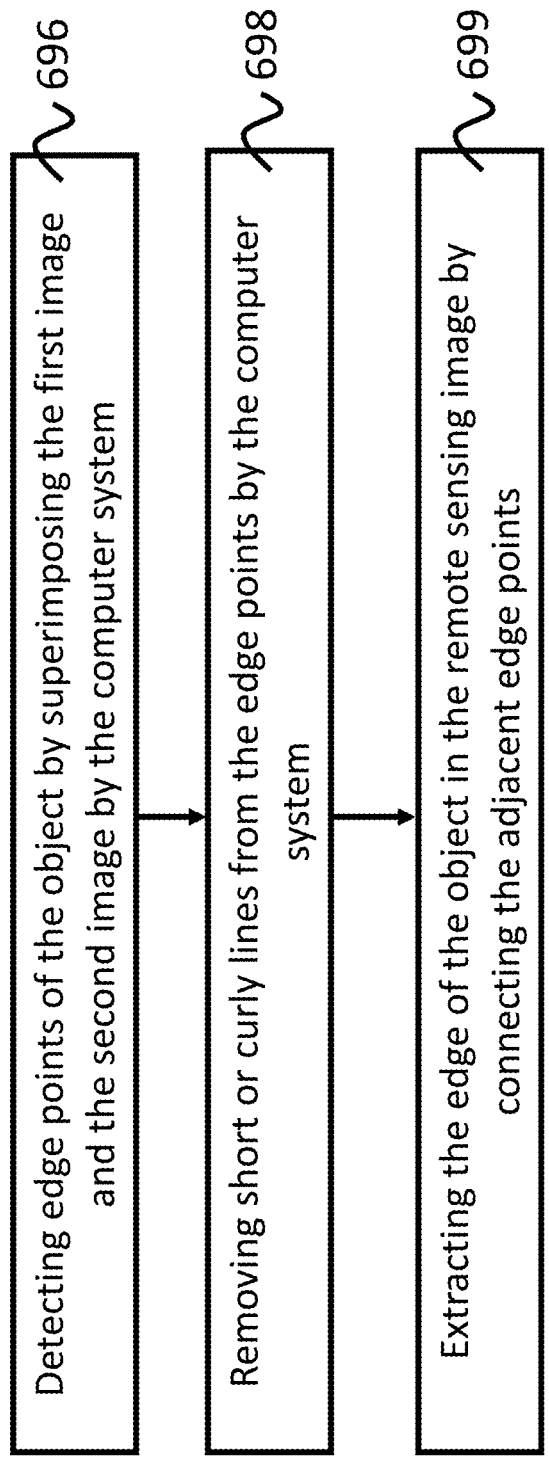

FIGS. 6A, 6B and 6C show a method executed by a computer system to extract an edge of an object in a remote sensing image. According to block 610, the remote sensing image is converted to a grayscale image by the computer system. According to block 620, histogram equalization is applied to the grayscale image by the computer image so that contrast of the grayscale image is improved. According to block 630, a median filter is executed to the grayscale image to reduce noise of the grayscale image by the computer system. According to block 640, a homomorphic filter is executed to the grayscale image by the computer system. According to block 650, a Gaussian filter is executed to the grayscale image by the computer system to smooth the grayscale image. According to block 660, a gradient strength of pixels of the grayscale image is calculated by the computer system. According to block 670, non-maximum suppression is applied to the grayscale image by the computer system to avoid spurious responses to edge extraction. According to block 680, the grayscale image is divided into multiple partitions by the computer system based on a brightness distribution of the pixels in the grayscale image. According to block 690, a set of dynamic threshold values of T_high and T_low for each of the multiple partitions is calculated by the computer system based on the brightness distribution of the pixels within each of the multiple partitions. According to block 692, a first image for each of the multiple partitions is obtained by setting to 0 the gradient strength of each pixel that is less than the T_high by the computer system. According to block 694, a second image for each of the multiple partitions is obtained by setting to 0 the gradient strength of each pixel that is less than T_low by the computer system. According to block 696, edge points of the object are detected by superimposing the first image and the second image by the computer system. According to block 698, short or curly lines are removed from the edge points by the computer system. According to 699, the edge of the object in the remote sensing image is extracted by connecting the adjacent edge points.

Figure 7:
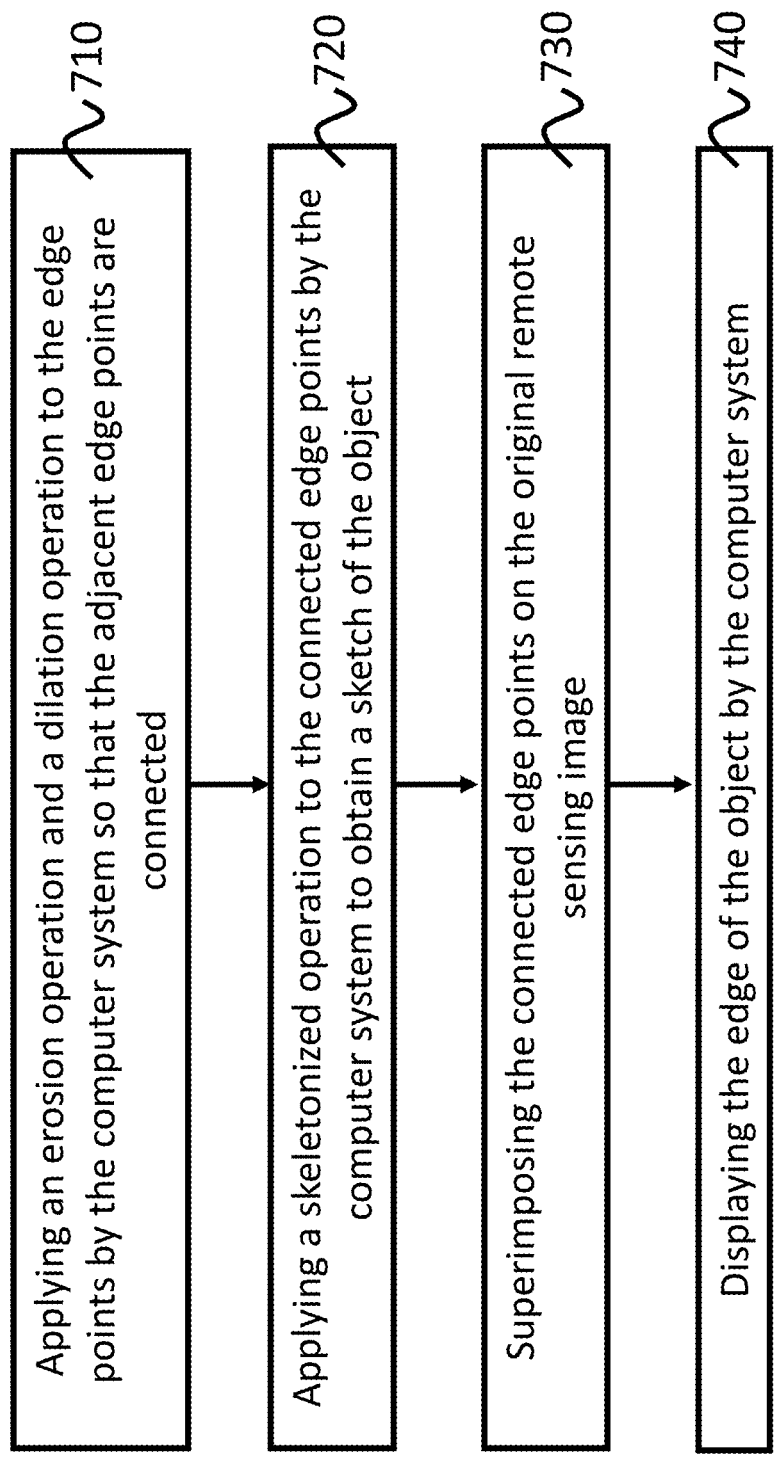
FIG. 7 shows a method to connect discontinuous and broken edge points by morphological operations including an erosion operation, a dilation operation and a skeletonized operation in accordance with an example embodiment.

FIG. 7 shows a method to connect discontinuous and broken edge points by morphological operations including an erosion operation, a dilation operation and a skeletonized operation. According to block 710, an erosion operation and a dilation operation are applied to the edge points by the computer system so that the adjacent edge points are connected. According to block 720, a skeletonized operation is applied to the connected edge points by the computer system to obtain a sketch of the object. According to block 730, the connected edge points are superimposed by the computer system on the original remote sensing image. According to block 740, the edge of object is displayed by the computer system.

Figure 8:
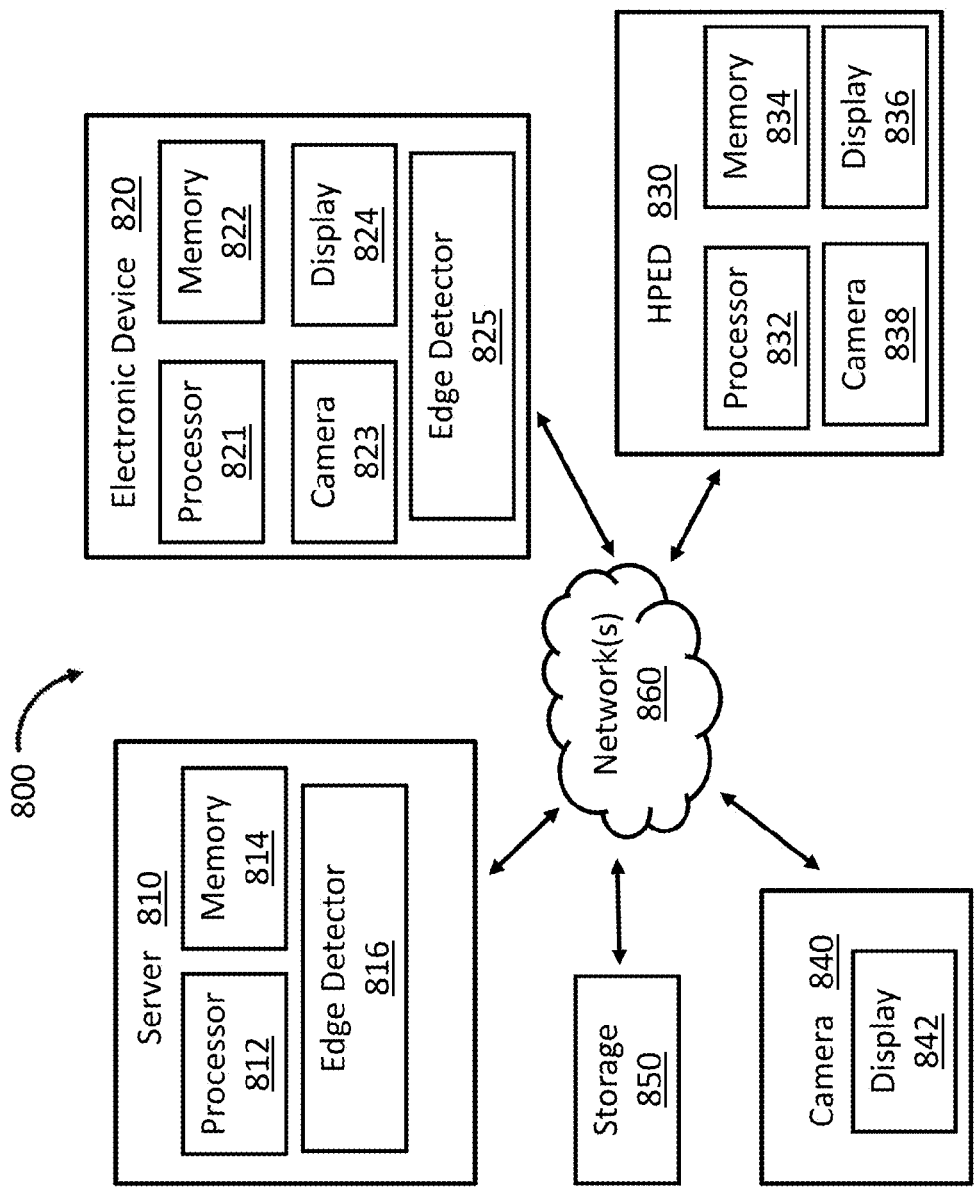
FIG. 8 shows a computer system to detect edge of an object in accordance with an example embodiment.

FIG. 8 shows a computer system 800 in accordance with an example embodiment. The computer system 800 includes a server 810, an electronic device 820, a Handheld Portable Electronic Device (HPED) 830, a camera 840 and a storage (850) in communicate with each other over one or more networks 860.

The network 860 can include one or more of the internet, an intranet, an extranet, a cellular network, a local area network (LAN), a Wi-Fi network, a home area network (HAN), metropolitan area network (MAN), a wide area network (WAN), a Bluetooth network, public and private networks, etc. Additionally, the server, electronic device, camera, HPED, and storage do not have to communicate with each other through a network. As one example, the server, electronic device, camera, HPED, and storage can couple together via one or more wires, such as direct wired-connection. As another example, the server, electronic device, camera, HPED, and storage can communicate directly through a wireless protocol, such as Bluetooth, near field communication (NFC), or other wireless communication protocol.

The server 810 include a processor 812 that communicates with a memory 814 and an edge detector 816. By way of example, the processor 812 can be a microprocessor, central processing unit (CPU), or application-specific integrated circuit (ASIC) for controlling and/or receiving instructions or data from the memory 814 (such as random access memory (RAM), read only memory (ROM), and/or firmware). The processor communicates with memory and performs operations and tasks that implement one or more blocks of the flow diagrams discussed herein. The memory, for example, stores applications, data, programs, algorithms (including software to implement or assist in implementing example embodiments) and other data.

By way of example, the edge detector 816 include one or more programs, software or algorithms to implement or assist in implementing edge detection in example embodiments.

The memory 814 for example, stores applications, data, programs, or algorithms including software to implement or assist in implementing example embodiments.

The electronic device 820 includes a processor 821, a memory 822, a camera 823, a display 824 and an edge detector 825. The camera 823 for example, captures an image of an object, the edge of which is to be detected. The display 824 for example, displays an original image of the object and an image treated under edge detection or edge extraction procedure(s).

HPED 830 can include a processor 832, a memory 834, a camera 838 and a display 836.

Camera 840 can include a display 842. By way of example, the camera 840 can take a picture of an object and the display 842 can display a user the original picture of the object or the picture of the detected edge of the object.

The storage 850 can include memory or databases that store one or more of images, including an original image of an object and an image generated under each procedure of example embodiments.

As used herein, a "structural element B" is a shape, used to probe or interact with a given image, with the purpose of drawing conclusion on how the shape fits or misses this shapes in the image. If it fits, the detected edge is kept otherwise it is removed.

In some example embodiments, the methods illustrated herein and data and instructions associated therewith are stored in respective memory or storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

What is claimed is:

1. A method executed by a computer system to detect an edge of an object with a Canny operator, the method comprising:
   executing, by the computer system, a Gaussian filter to smooth an image of the object so that noise of the image is removed;
   calculating, by the computer system, a gradient strength of pixels of the image;
   applying, by the computer system and to the image, non-maximum suppression to avoid spurious responses to edge detection;
   dividing, by the computer system, the image into multiple partitions based on a brightness distribution of the pixels in the image;
   calculating, by the computer system and for each of the multiple partitions, a set of dynamic threshold values of T_high and T_low based on the brightness distribution of the pixels within each of the multiple partitions;
   obtaining, by the computer system and for each of the multiple partitions, a first image by setting to 0 the gradient strength of each pixel that is less than the T_high;
   obtaining, by the computer system and for each of the multiple partitions, a second image by setting to 0 the gradient strength of each pixel that is less than T_low; and
   detecting, by the computer system, the edge of the object by superimposing the first image and the second image.

2. The method of claim 1, wherein the set of dynamic threshold values for each of the multiple partitions is set based on local contrast.

3. The method of claim 1, wherein each of the multiple partitions has a triangle, diamond, rectangle, cross or irregular shape.

4. The method of claim 1, wherein the ratio of T_high and T_low is 2.5-2.

5. The method of claim 1, wherein the object is Polygonal Patterned Ground.

6. The method of claim 1, wherein the object has an irregular shape.

7. The method of claim 1, wherein the image is a remote sensing image.

8. A method executed by a computer system to extract an edge of an object in a remote sensing image, the method comprising:
   converting, by the computer system, the remote sensing image to a grayscale image;
   applying, by the computer system and to the grayscale image, a histogram equalization so that a contrast of the grayscale image is improved;
   executing, by the computer system and to the grayscale image, a median filter to reduce noise of the grayscale image;
   executing, by the computer system and to the grayscale image, a homomorphic filter;
   executing, by the computer system and to the grayscale image, a Gaussian filter to smooth the grayscale image;
   calculating, by the computer system, a gradient strength of pixels of the grayscale image;
   applying, by the computer system and to the grayscale image, non-maximum suppression to avoid spurious responses to edge extraction;
   dividing, by the computer system, the grayscale image into multiple partitions based on a brightness distribution of the pixels in the grayscale image;
   calculating, by the computer system and for each of the multiple partitions, a set of dynamic threshold values of T_high and T_low based on the brightness distribution of the pixels within each of the multiple partitions;
   obtaining, by the computer system and for each of the multiple partitions, a first image by setting to 0 the gradient strength of each pixel that is less than the T_high;
   obtaining, by the computer system and for each of the multiple partitions, a second image by setting to 0 the gradient strength of each pixel that is less than the T-low;
   detecting, by the computer system, edge points of the object by superimposing the first image and the second image;
   removing, by the computer system, short or curly lines from the edge points; and
   extracting, by the computer system, the edge of the object in the remote sensing image by connecting the edge points that are adjacent.

9. The method of claim 8, wherein morphological operations are applied to connect the edge points that are adjacent.

10. The method of claim 8 further comprising:
applying, by the computer system and to the edge points, an erosion operation and a dilation operation to connect the edge points that are adjacent; and
applying, by the computer system and to the edge points that are connected, a skeletonized operation to obtain a sketch of the object.

11. The method of claim 8 further comprising:
superimposing, by the computer system, the edge points that are connected on the remote sensing image; and
displaying, by the computer system, the edge of the object.

12. The method of claim 8, wherein the object is Polygonal Patterned Ground.

13. The method of claim 8, wherein the set of dynamic threshold values for each of the multiple partitions is set based on local contrast.

14. The method of claim 8, wherein each of the multiple partitions has a triangle, diamond, rectangle, cross or irregular shape.

15. The method of claim 8, wherein the ratio of T_low and T_high is 0.4.

16. The method of claim 8, wherein the object has an irregular shape.

17. The method of claim 8, wherein an area of a domain surrounded by the edge points that are connected is no less than a threshold value Ta.

18. The method of claim 17, wherein Ta is set as 20 pixels.

19. The method of claim 8, wherein a perimeter of a domain surrounded by the edge points that are connected is no less than a threshold value Tc.

20. The method of claim 19, wherein Tc is set as 38 pixels.

* * * * *